US007822002B2

(12) United States Patent
Narayanan et al.

(10) Patent No.: US 7,822,002 B2
(45) Date of Patent: Oct. 26, 2010

(54) DYNAMIC ADDRESS REDEMPTION BY PROXY IN STATICALLY ADDRESSED WIRELESS PERSONAL AREA NETWORKS

(75) Inventors: Vimal Venkatesh Narayanan, Banaswadi (IN); Karthik Prabhakar, Bangalore (IN); Peramachanahalli Ramkumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 967 days.

(21) Appl. No.: 11/648,043

(22) Filed: Dec. 29, 2006

(65) Prior Publication Data

US 2008/0159289 A1      Jul. 3, 2008

(51) Int. Cl.
*H04W 4/00*      (2009.01)
(52) U.S. Cl. ............... 370/338; 455/426.1; 455/432.1; 709/225; 709/226
(58) Field of Classification Search ................ 455/41.2, 455/41.3, 426.1, 432.1; 370/328–388, 230; 709/225, 226
See application file for complete search history.

(56) References Cited

U.S. PATENT DOCUMENTS

| 6,934,752 | B1 * | 8/2005 | Gubbi | .................. 709/225 |
| 2006/0203768 | A1 * | 9/2006 | Stolyar | ................ 370/329 |
| 2009/0006596 | A1 | 1/2009 | Dinakaran et al. | |

OTHER PUBLICATIONS

IP address assignment in a mobile ad hoc network by Mansoor Mohsin and Ravi Prakash (IEEE, MILCOM 2002, pp. 862-867 vol. 2, Oct. 2002).*
Mohsin et al. IEEE, MILCOM 2002, pp. 862-867 vol. 2, Oct. 2002.*

* cited by examiner

*Primary Examiner*—Nick Corsaro
*Assistant Examiner*—Quan M Hua
(74) *Attorney, Agent, or Firm*—Lee & Hayes, PLLC

(57) ABSTRACT

Described herein are one or more implementations for a mesh, peer-to-peer, cluster-tree, hierarchical wireless personal area network (WPAN) technology that uses a new approach to the static network address allocation scheme. As described herein, the new approach employs dynamic redemption or reallocation of free addresses from existing static allocations to other router-nodes in a WPAN.

26 Claims, 5 Drawing Sheets

Background

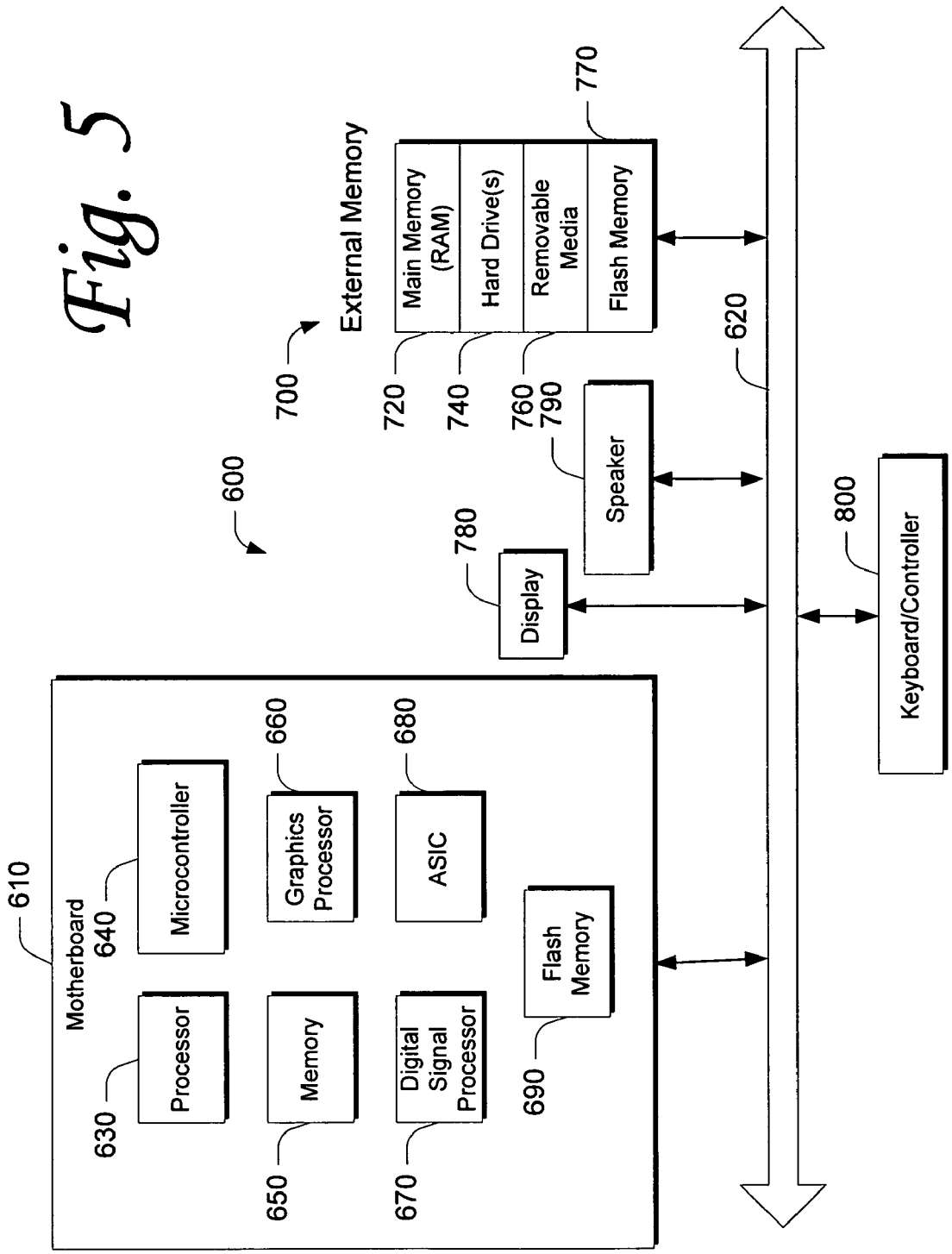

DYNAMIC ADDRESS REDEMPTION BY PROXY IN STATICALLY ADDRESSED WIRELESS PERSONAL AREA NETWORKS

BACKGROUND

A mesh, peer-to-peer, cluster-tree, hierarchical personal area network (PAN) technology is well suited to a wide range of building automation, industrial, medical and residential control & monitoring applications. Examples of common applications include (by way of example and not limitation):

Lighting controls;
Automatic Meter Reading;
Wireless smoke and CO detectors;
HVAC control;
Heating control;
Home security;
Environmental controls;
Blind, drapery and shade controls;
Medical sensing and monitoring;
Industrial and building automation.

ZigBee™ is one example of a conventional mesh, peer-to-peer, cluster-tree, hierarchical personal area network (PAN) topology. According to zigbee.org, ZigBee is the name of a specification for a mesh, peer-to-peer, cluster-tree, and hierarchical network topology and set of protocols using that topology. The ZigBee technology utilizes small, low-power digital radios based on the Institute of Electrical & Electronics Engineers (IEEE) 802.15.4 standard for wireless personal area networks (WPANs). A WPAN is a wireless computer network used for communication among computer devices located in very close proximity to each other; typically the range is that which is close to a person. Typically, the reach of a WPAN is a room (e.g., 50-100 metres).

In the case of a typical mesh, peer-to-peer, cluster-tree, and hierarchical PAN topology, there are often intermediary levels where nodes function as routers. These so-called router-nodes are allocated fixed blocks of network address space that they then further allocate to their children nodes. Under this conventional approach of the static allocation of address blocks, when a new terminal node wants to join an existing PAN, that node must request admission and receive an address on that network. This new node might be a node that had left the network at some other physical point and wants to rejoin at another. Alternatively, the new node may be entirely new to the network.

If the node is close to another router-node in the network, the conventional network management typically tries to allocate addresses to the new node from the fixed address space assigned to the router-node. If the fixed address space is already used up, the network does not admit the new node. Although there may be other router-nodes with unallocated address space, this new node is refused admission to the network because the in-range router-node—through which the new node is attempting to access the network—has exhausted its statically allocated fixed addresses.

This situation occurs with conventional mesh, peer-to-peer, cluster-tree, and hierarchical PAN standards (such as ZigBee) because such conventional approaches use an inflexible static allocation of address space to nodes and router-nodes in the networks hierarchical topology.

BRIEF DESCRIPTION OF THE DRAWINGS

The same numbers are used throughout the drawings to reference like elements and features. The drawings include:

FIG. 5 illustrates an exemplary system suitable for carrying out (wholly or in part) one or more implementations described herein

DETAILED DESCRIPTION

One or more implementations are described herein for a mesh, peer-to-peer, cluster-tree, hierarchical wireless personal area network (WPAN) technology that uses a new approach to the static network address allocation scheme of more conventional approaches. As described herein, the new approach employs dynamic redemption of free addresses from existing static allocations to other router-nodes. Alternatively, as described herein, the new approach may employ dynamic reallocation of free addresses from unassigned address space to router-nodes which have exhausted their assigned quota.

The new described approaches offer several advantages over the classic rigid static address allocation scheme of conventional mesh, peer-to-peer, cluster-tree, hierarchical WPAN technology. The described new approaches offer (by way of example only and not limitation):

Better utilization of network addresses available to the network.

Provision of dynamism in network address allocation allowing more flexibility so that moving nodes can easily rejoin the network rather than being kept out due to the non-availability of addresses at a particular parent node.

Low overhead in the dynamic reallocation of addresses within a PAN.

Conventional Static Address Allocation

ZigBee™ is an example of a conventional mesh, peer-to-peer, cluster-tree, hierarchical personal area network (PAN) topology that typifies the conventional state of the art. At the time of establishing a typical Zigbee network, the PAN coordinator determines the maximum number of children nwkMaxChildren ($C_m$) that any device within the network is allowed. Of these, a maximum number of nodes nwkMaxRouters ($R_m$) can be router-capable devices (called "router-nodes" herein). The PAN coordinator also determines the maximum depth of the network nwkMaxDepth ($L_m$).

Given these values, the value of $C_{skip(d)}$ (which is the size of the address sub-block being distributed by each parent at depth, d, to its router-capable devices) is calculated using the formula given in equation 1 below:

$$C_{skip(d)} = \begin{cases} 1 - C_m(L_m - d - 1), & \text{if } R_m = 1 \\ \dfrac{1 - C_m - R_m - C_m R_m^{L_m-d-1}}{1 - R_m} \end{cases} \quad \text{Equation 1}$$

Figure 1:
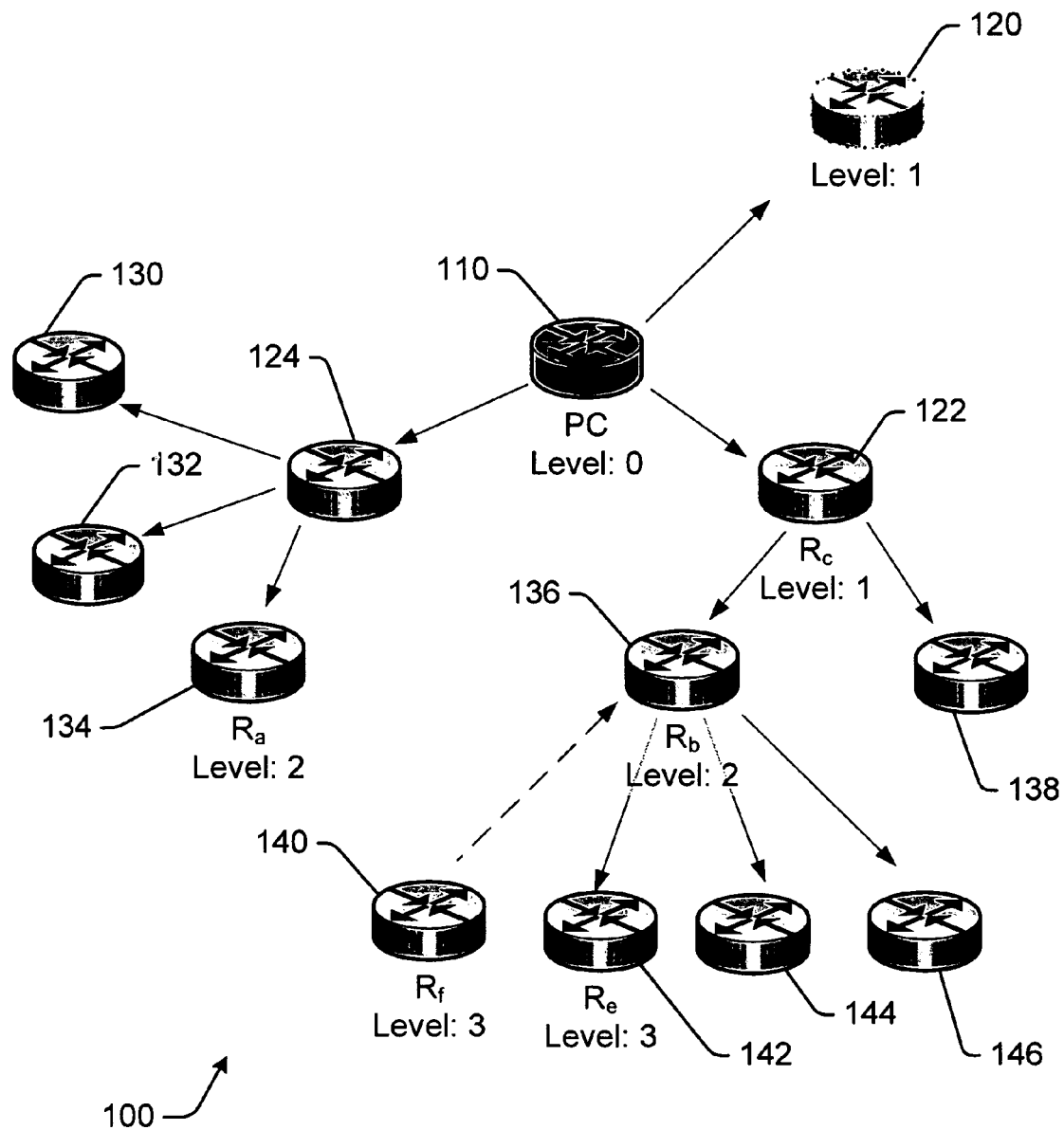
FIG. 1 illustrates an example of conventional mesh, peer-to-peer, cluster-tree, and hierarchical personal area network (PAN) standards (such as ZigBee™).

FIG. 1 shows an exemplary topology 100 of a typical ZigBee network, which is established with $C_m$=3, $R_m$=3, $L_m$=3. The top of the hierarchy of the network topology is Level 0. Below that are Level 1, then Level 2, then Level 3, and so forth. As depicted, Level 0 includes node 110, which is the PAN coordinator. At Level 1, the next level down, nodes 120, 122, and 124 are depicted. At Level 2, the next level down, nodes 130, 132, 134, 136, and 138 are depicted. Level 3, the last level depicted, includes nodes 140, 142, 144, and 146. In this figure (and all figures herein that depict a network topology), the solid arrows represent an existing network address assignment. The direction of the solid arrows indicates from where the child node received its network address assignment. Router-nodes in this figure include the PAN coordinator 110 and nodes 122, 124, and 136. For each of these router-nodes, a range of fixed addresses is allocated.

As depicted, a dashed arrow represents the new node 140 attempting to join the network. In this example, it is assumed that router-node 136 has already exhausted its allotted range of addresses. Consequently, new node 140's attempt to join the network through router-node 136 will be rebuffed within a conventional mesh, peer-to-peer, cluster-tree, hierarchical PAN such as ZigBee. That is because the router-node has no addresses to assign to the new node.

Due to this, even if the new node 140 had earlier been connected through some other router-node (such as router-node 122) in the network but had physically migrated closer to the new router-node 136, the new node 140 could not be allocated the space it had vacated from its old location within ZigBee. Furthermore, even if some address space is free elsewhere in the ZigBee network, the new node 140 cannot be allocated an address from that free space. The result of this conventional approach is that the new node 140 is simply lost from the network. More than just unfortunate, this scenario is not acceptable in most applications where sensor networks are used if they convey real-time critical data and where the network has to accommodate the mobility of nodes.

Dynamic Redemption and Reallocation of Statically Allocated Address Space

The newly described approaches employ dynamic redemption and/or reallocation of statically allocated network address space. These new approaches do this in an optimized manner to conserve computing and communication overheads.

In describing how the new approach functions, consider a case wherein a fresh node submits a network-join request to the nearest potential router-node (i.e. parent). That potential parent tries to allocate one or more addresses from its statically assigned address space; however, that potential parent has already used up its assigned address space.

In such a situation with the new described approach, the fresh node trying to join the network queries its potential parent node for one or more addresses. If there are no addresses free at the potential parent node, then the query is escalated to the parent of the potential parent node, and so on, until the query reaches the PAN coordinator. This process will terminate at any parent (herein called the "proxy" node) in this path that can grant one or more free addresses from its allocated address space. Thereafter, the so-granted address space is propagated down to the requesting node along the same path. When the new so-granted address space propagates down the hierarchy, the proxy table of every node along the way is updated to handle routing to the proxy node. Later, when routing information is needed, the routing algorithm first looks at the proxy table and then at the dynamic routing table to comply with the address redemption procedure.

Furthermore, when allocating addresses a node (such as a potential parent or those nodes above it on the hierarchy) allocates the same amount of addresses based on the hierarchical level of the fresh node where it joins the hierarchical tree. If a node on top of the hierarchy has a free address space, that node will still calculate to the depth of the same level of the fresh node. When a fresh node joins at the address space from which a part has been proxied then the parent who has the proxy data passes the proxy information to the new node joining.

This kind of allocation of address space involves maintaining a proxy table at the node from whose sub-block the address space has been taken to accommodate the newly joining node. All the nodes between the donating node and the requesting device also maintain appropriate entries in their local proxy tables.

The new approaches employ a proxy table with only a few entries (e.g. preferable less than twenty entries). Although the described approaches introduce a small overhead required to search the proxy table before normal hierarchical routing, doing this will not create a major bottleneck because each of the proxy tables contains just a few entries. This overhead may be further reduced by reordering the proxy table after some or all of the lookups into the proxy table are performed. The result of the reordering of the proxy table will list the most recently looked-up entry as the first entry in the table. This reduces search time for subsequent searches for the same entry.

With conventional approaches, a node has a PermitJoining attribute which is set to TRUE only for potential parent nodes that have network addresses available for allocation to a fresh node. However, with the newly described approaches the PermitJoining attribute is set to TRUE for all potential parent nodes regardless of whether its full static allotment of addresses are assigned. The attribute will be set to FALSE only once the network reaches a state where there is absolutely no address to provide. Hence, all potential parent nodes permit network-join requests to enter.

When a potential parent node does not have any address space to assign to the newly joining (i.e. "fresh") node, the potential parent node sends an Address Request command to its parent. This is a new command that is part of the new approaches described herein. For compatibility, the format of this new command is the same as that of the conventional network layer (i.e., NWK) command frame format as shown in Tables 1, 2, and 3.

TABLE 1

| Octet: 1 | 6 | 1 | Variable |
|---|---|---|---|
| Frame Control | Routing Fields | NWK command Identifier | NWK command payload |
| NWK header | | NWK payload | |

TABLE 2

| Command frame identifier | Command name |
|---|---|
| 0x05 | Address request |
| 0x06 | Address reply |

TABLE 3

| Octet: 1 | 2 | 2 | 2 |
|---|---|---|---|
| Command frame identifier | Command Options | Requestor address | Number of Addresses |
| | NWK payload | | |

The NWK address and Number of Addresses required by the fresh node, which is making the address request, are passed as parts of the frame to its parent. The Number of Addresses field denotes the amount of addresses that the fresh node would want to support, thereby allowing for dynamic growth of any sub-net in the network. This number is typically decided by the fresh node.

Figure 2:
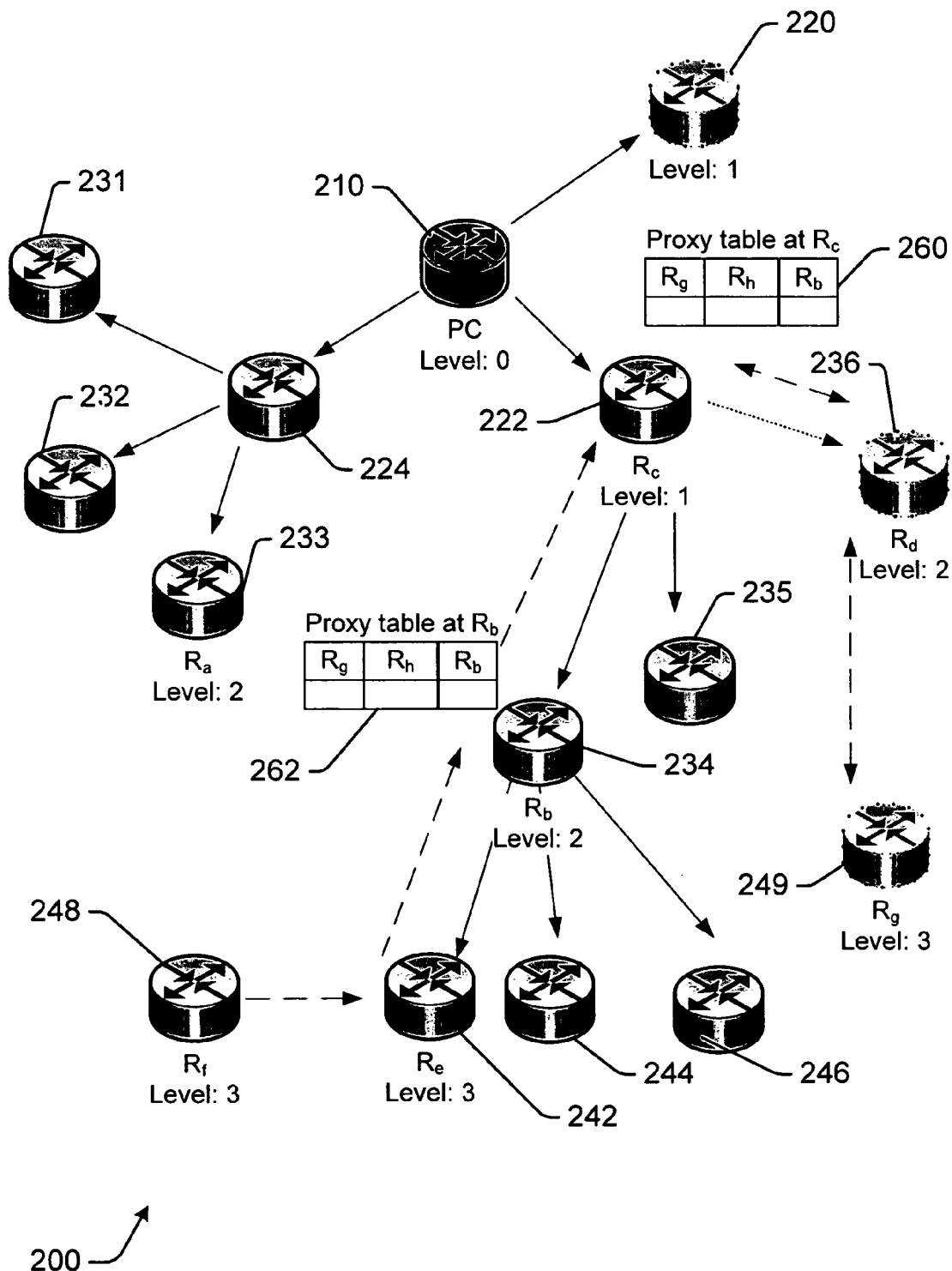
FIG. 2 illustrates, in accordance with one or more implementations described herein, the dynamic redemption and/or reallocation of network address space within the context of an exemplary conventional mesh, peer-to-peer, cluster-tree, and hierarchical PAN.

Effect Upon Receipt of Address Request by Parent:

FIG. 2 illustrates an exemplary operation scenario of the described new approaches in the context of an exemplary network topology 200. In this exemplary network topology 200, the maximum number of routers is 3 (Rm=3), the maximum number of children is 4 (Cm=4), and the maximum depth of the network is 4 (Lm=4). As depicted, a parent node may already be supporting the designated maximum number of router-nodes (Rm) or the maximum number of children (Cm). In that case, the address request frame is passed further up the hierarchy to the parent of the parent node and the same procedure repeats at this grandparent node level.

In FIG. 2, the top of the hierarchy of the network topology is Level 0. Below that are Level 1, then Level 2, then Level 3, and so forth. As depicted, Level 0 includes node 210, which is the PAN coordinator. At Level 1, the next level down, nodes 220, 222, and 224 are depicted. At Level 2, the next level down, nodes 231, 232, 233, 234, 235, and 236, are depicted. Level 3, the last level depicted, includes nodes 240, 242, 244, 246, 248, and 249. In FIG. 2 (and all figures herein that depict a network topology), the solid arrows represent existing network address assignments. The direction of the solid arrows indicates from where the child node received its network address assignment.

As depicted, a dashed arrow represents fresh node 248 attempting to join the network. In this example, it is assumed that router-node 242 has already exhausted its allotted range of addresses. Consequently, as indicated by dashed arrow 250, router-node 242 forwards this request to its parent node 234. For the purpose of discussion, that parent node 234 is already supporting its maximum number of routers and hence the request is passed up the hierarchy to parent node 222.

In this exemplary operating scenario, parent node 222 has available address space. That is because parent node 222 is either not already supporting the designated maximum number of router-nodes (Rm) or the maximum number of children (Cm).

The potential parent node 222 performs a calculation to identify the first address sub-block of size "n" within its allocated address range. Here, "n" is the number of addresses requested and is also specified in the Address Request frame (shown in Table 3). The value of n may range from one to a designated or practical maximum number of possible addresses. This n-sized address sub-block is called the "candidate address block" at this point because these addresses are not yet allocated.

Once the candidate address block is identified, the potential parent node 222 verifies with the local proxy table that the candidate address block has not already been given out as a proxy. In other words, the parent node makes sure that it has not already allocated those addresses via some other previous dynamic address reallocation. Now, the candidate address block represents the to-be-allocated address block.

Starting with the potential parent node 222 and continuing down the hierarchical tree, the identified to-be-allocated address block is communicated back to the original requesting device (i.e. fresh node 248). The to-be-allocated address block is propagated from the parent node providing the addresses to the fresh node via an Address Reply command. The fields for this command are shown in Table 4.

TABLE 4

| Octet: 1 | 2 | 2 | 2 |
|---|---|---|---|
| Command frame identifier | Command Options | Start address | End Address |
| | NWK payload | | |

The address range that is passed in this manner is recorded in a node's proxy table suggesting that any frames coming to an address falling within that range has to follow the route mentioned in the node's proxy table. The end result of the new router-join request (of fresh node 248) at router-node 234 is shown along with the entries that will be added to the proxy table at node 222.

FIG. 2 shows representations of proxy tables for two nodes: Proxy table 260 for parent node 222 and proxy table 262 for parent node 234. The format of these proxy tables is illustrated by Table 5 below.

TABLE 5

| Octet: 2 | 2 | 2 |
|---|---|---|
| Start Address | End Addess | Proxy next hop |

Again looking at FIG. 2, assume that fresh node 249 is attempting to join the network via potential parent node 236. Since, node 236 does not have any available addresses for allocation, the network-join request is forwarded up the hierarchical tree to node 222. At that node, address space is allocated and an Address Reply command is propagated back to fresh node 249.

At a later stage, when node 236 actually comes to join parent node 222 and is allocated an address space that includes the addresses already proxied to fresh node 248, the proxy entries at parent node 222 (from table 260) corresponding to addresses in the address space of node 236 are copied into proxy table 262 (i.e. the proxy table for node 234). Essentially, the proxy information is communicated downwards to the children if addresses are taken from their statically assigned space.

As any frame going to an address in the "proxy" address range has to go through the parent in a hierarchical routing, the proxy effect is local to that sub-net contained within the parent performing the proxy. Hence, this aliasing of addresses is transparent to the devices outside of that sub-net.

Reclaiming Unallocated Network Addresses

With conventional static allocation of network addresses in a conventional mesh, peer-to-peer, cluster-tree, hierarchical personal area network (PAN) topology, some addresses remain unused and unallocated to any node. That is because a designated sub-set of available addresses is allocated based upon the anticipated number of nodes in the network. The designated sub-set contains less than the maximum possible for the addressing scheme used. The pool of unused addresses includes those addresses in the address space that remain after the static allocation of address sub-blocks to potential parents by the PAN coordinator. In a conventional scenario, no more nodes than those originally anticipated can be supported by an established PAN.

However, with the new approaches described herein, the PAN coordinator can accommodate as many nodes as the addressing scheme allows in an established network. Using the new attribute nextFreeAddress, the PAN coordinator specifies the next available network address within the total addressable space after the static allocation of addresses has been conducted (using, for example, the formula given in equation 1). In this way, the network may be scaling up the capacity of the network without adding complexity in its initial address assignment and without much memory usage.

Updating the Proxy Table of a Fresh Node

When a potential parent node—one that still has unused assigned address space—receives a network-join request (and the "Address Proxy" mechanism is enabled), the potential parent verifies that a part of the address space has been used to proxy another node. If so, the fresh node is allowed to join the network, but immediately after joining, an entry is made in the local proxy table of the fresh node. That entry indicates the part of the fresh node's address range that has been used to proxy the other node. This entry basically provides a copy directly from the parent node to which the fresh node connects to the network.

Hierarchical Routing with Address Proxying

When hierarchical routing data and commands are sent through the network, the proxy table is checked before any frames are actually routed. Checking the table verifies that the address is indeed in the place expected. In the case where an entry for that address' space exists in the proxy table, then the frame follows the immediate next hop field given for that space in the table. At the next device, a corresponding entry again exists to route the frame to the appropriate destination. These entries are made at the time of address proxy, specifically to aid hierarchical routing.

Alternatively, if the entry for that address' space does not exist in the proxy table, then the routing is performed using the standard and conventional hierarchical routing.

Figure 3:
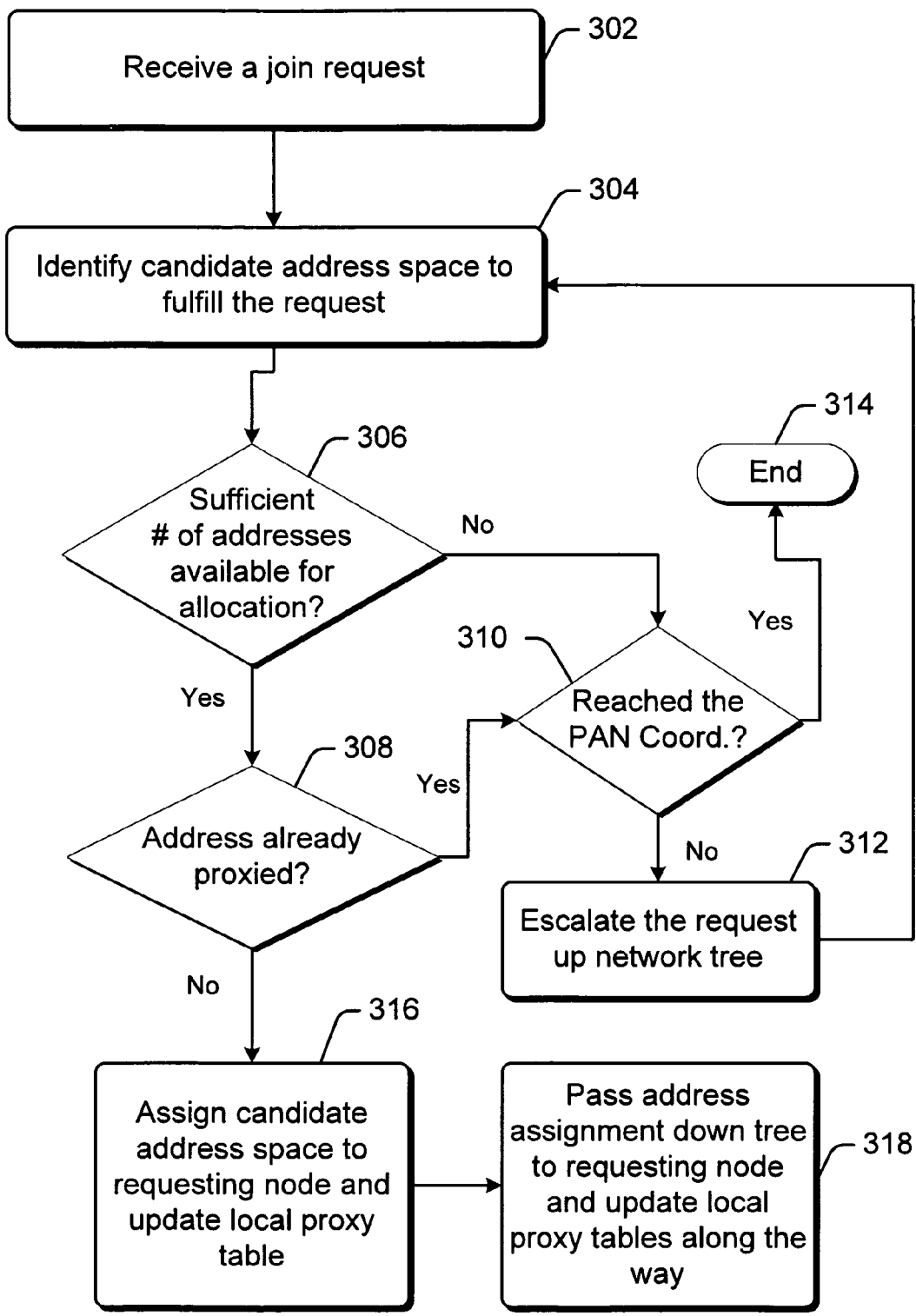
FIGS. 3 and 4 present flow diagrams showing the methodological implementations described herein.

Methodological Implementation for the Dynamic Re-Allocation/Redemption of Statically Allocated Address Space FIG. 3 shows a method 300 for managing statically allocated network address space in a mesh, peer-to-peer, cluster-tree, hierarchical wireless personal area network (WPAN). This method 300 is performed by one or more of the various components as depicted in FIGS. 2 and/or 5. Furthermore, method 300 may be performed in software, hardware, firmware, or a combination thereof. For ease of understanding, this method is delineated as separate steps represented by independent blocks in FIG. 3; however, these separately delineated steps should not be construed as necessarily order dependent in their performance. For discussion purposes, method 300 may be described with reference to FIGS. 2 and/or 5. Additionally, particular components are indicated as performing particular functions; however, other components (or combinations of components) may also perform these particular functions.

At block 302 of FIG. 3, one of a nodes (such as node 242) receives a network-join request from a fresh node (such as node 248). That request seeks to get an address for the fresh node in order for it to join the WPAN of the request-receiving node. Alternatively, the request may ask for a range of addresses so that the fresh node may act as a router-node. The range of addresses requested is of size "n" and is specified in the address request frame (shown in Table 3).

At block 304, the request-receiving node identifies a candidate address space that can fulfill the request. To satisfy the request, the candidate address space needs a sufficient number of free addresses in the already-statically-allocated address space of the request-receiving node.

At block 306, the request-receiving node determines whether the candidate address space can indeed fulfill the request by possessing a free address space of size "n" within its allocated address range. If the request-receiving node does have an available n-sized address block, this is called the "candidate address block" and the process proceeds to block 308. If there is no available n-sized address block, then the process continues to the escalation blocks (310-314).

At block 308, the request-receiving node uses its local proxy table to verify that the candidate address block has not already been given out as a proxy. In other words, the request-receiving node makes sure that the request-receiving node has not already allocated those addresses via another previous dynamic address reallocation. If the candidate address block includes addresses that have already been given out as proxies, then the process continues to the escalation blocks (310-314).

The process jumps to the escalation blocks (310-314) whenever the current request-receiving block is not capable of fulfilling the request for an available n-sized address block.

At block 310, the request-receiving node determines if the request-receiving node is the PAN coordinator, and thus the root of the tree. If so, the process ends at 314 and a message is sent back to the original fresh node that its request cannot be fulfilled. Consequently, it is not allowed to join the network. Alternatively, the process may continue down other branches of the network tree to see if the nodes of those other branches may have network address space to spare. If the request-receiving node is not at the end of the line for finding free network address space, then the process continues with block 312.

At block 312, the current request-receiving node determines which node to which this request should be escalated. Typically, the escalation-target node is the parent node of the current request-receiving node. However, in alternative implementations, the request may move towards the children nodes of the current request-receiving node. Those children nodes may have network address space to spare. For this example here, it is assumed that the current request-receiving node just escalates the request to its parent node. Once the escalation-target node is identified, the request is sent to the escalation-target node and that node becomes the current request-receiving node. The process jumps back to block 304 and the process repeats from that point but with a new current request-receiving node.

Referring back to blocks 306 and 308, if the candidate address block is properly identified and no address in that block has already been proxied, then the process proceeds to block 316.

At block 316, that candidate address block is assigned to the fresh node (i.e. the original requesting node). The local proxy table of the current request-receiving node is updated. Now, the request-receiving node becomes the "proxy" node because it is dynamically reallocating (i.e. proxying) one or more of the addresses that were originally statically allocated to that request-receiving node.

At block 318, the candidate address block assignment is communicated to the fresh node. This is done by propagating the address assignment (with an Address Reply command) down the network tree from the current request-receiving node—which is the parent node—to the fresh node. The fields for an exemplary Address Reply command are as shown in Table 4.

As the address assignment command is propagated through the network tree, the nodes through which the command passes examine the command and update their proxy table accordingly. That way, each node in the address assignment path updates its own proxy table so that each table accurately reflects the dynamic reallocation of addresses. As a consequence, each node along the hierarchical path between the proxy node and the requesting node updates its own proxy table. The proxy table at each node indicates that the new proxy-granted address space is now "owned" by the requesting node and not the original owner, the proxy node. Later, when routing information is needed, the routing algorithm will first look into the proxy table and then to the dynamic routing table to comply with the address redemption procedure.

Methodological Implementation for Routine

Figure 4:
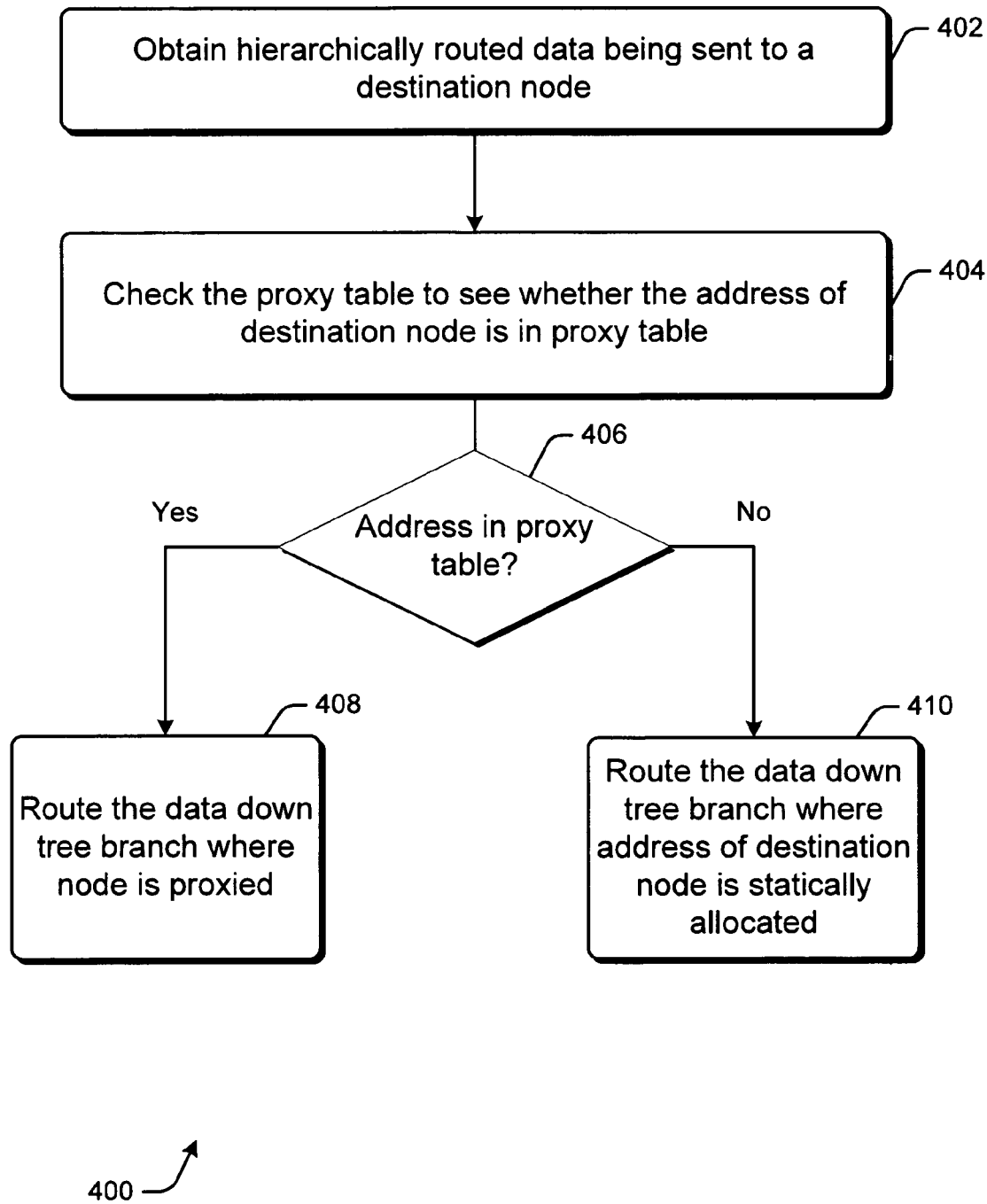

FIG. 4 shows method 400 for managing statically allocated network address space in a mesh, peer-to-peer, cluster-tree, hierarchical wireless personal area network (WPAN). This method 400 is performed by one or more of the various components as depicted in FIGS. 2 and/or 5. Furthermore, method 400 may be performed in software, hardware, firmware, or a combination thereof. For ease of understanding, this method is delineated as separate steps represented by independent blocks in FIG. 4; however, these separately delineated steps should not be construed as necessarily order dependent in their performance. For discussion purposes, method 400 may be described with reference to FIGS. 2 and/or 5. Additionally, particular components are indicated as performing particular functions; however, other components (or combinations of components) may also perform these particular functions.

At block 402 of FIG. 4, a node (e.g. node 222) receives hierarchically routed data and/or command from another node (e.g., PAN coordinator 210 or node 234). That routed data and/or command has a specified destination network address.

At block 404, the node checks its proxy table before any frames are actually routed. From this, the node determines if the specified address has already been proxied, and then it identifies the branch of the tree on which the proxied address is located. If the address has not been proxied, then the node identifies the proper branch based upon the specified address being located in the address space allocated to a given branch.

At block 406, the node sends the routed data and/or command down the identified branch in which the proxied or non-proxied specified address is located. In case an entry for that specified address' space exists in the proxy table, then the frame follows to the immediate next hop field (i.e. next hop in the branch) given for that space in the table. Alternatively, if the entry for that address' space does not exist in the proxy table, then the routing is performed using the standard and conventional hierarchical routing.

At block 408, the checking and sending steps are repeated until the routed data and/or command arrives at the destination node.

Exemplary System

Referring to FIG. 5, a block diagram of an exemplary electronic system that can include transistors fabricated with copper interconnects, such as those described above, is shown generally at 600. Such electronic systems can include a computer system containing a motherboard 610 electrically coupled to various components in electronic system 600 via a system bus 620. System bus 620 may be a single bus or any combination of busses.

A motherboard 610 can include, among other components, one or more processors 630, a microcontroller 640, memory 650, a graphics processor 660 or a digital signal processor 670, and/or a custom circuit or an application-specific integrated circuit 680, such as a communications circuit for use in wireless devices such as cellular telephones, pagers, portable computers, two-way radios and similar electronic systems and a flash memory device 690.

The electronic system 600 may also include an external memory 700 that in turn includes one or more memory elements suitable to the particular application, such as a main memory 720 in the form of random access memory (RAM), one or more hard drives 740, and/or one or more drives that handle removable media 760, such as floppy diskettes, compact disks (CDs) or digital video disks (DVDs). In addition, such external memory may also include a flash memory device 770.

The electronic system 600 may also include a display device 780, a speaker 790, and a controller 800, such as a keyboard, mouse, trackball, game controller, microphone, voice-recognition device, or any other device that inputs information into the electronic system 600.

CONCLUSION

Unless the context indicates otherwise, discussions herein regarding the function of the described implementations apply to both wired and wireless PANs.

The techniques described herein may be implemented in many ways, including (but not limited to) program modules, general- and special-purpose computing systems, network servers and equipment, dedicated electronics and hardware, or as part of one or more computer networks.

Although one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A tangible computer-readable medium having computer executable instructions that, when executed on a computing device, perform a method comprising:
  receiving a network-join request to join a mesh, peer-to-peer, cluster-tree, hierarchical personal area network of network nodes, wherein network addresses are statically allocated to the network nodes;
  determining whether a parent node has an available network address space that may be assigned to an incoming fresh node to fulfill the join-request, wherein the network address space comprises one or more network addresses;
  based upon the determining act, fulfilling the network-join request with the #-available network address space if the available network address space is identified in the determining act;
  sending—after the fulfilling act—via the mesh, peer-to-peer, cluster-tree hierarchical personal area network, an address notification to the incoming fresh node;
  updating proxy tables of only those network nodes along a path through the hierarchical personal area network taken by the sent address notification, wherein the updated proxy tables indicate that the available network address space is assigned to the incoming fresh node;
  based upon the determining act, escalating the network-join request to another parent node in the hierarchical personal area network if the available network address space is not identified in the determining act;
  another determining whether another parent node has an available network address space that may be assigned to the incoming fresh node to fulfill the join-request;
  if, in the another determining act, the available network address space is identified, again fulfilling the network-join request with the available network address space and updating a proxy table of the another parent node so that the updated proxy table indicates that the available network address space is no longer available and is now assigned to the incoming fresh node;

again sending—after the fulfilling act—via the hierarchical personal area network the address notification to the incoming fresh node if, in the another determining act, the available network space is identified;

again updating proxy tables of only those nodes along the path through the hierarchical personal area network taken by the sent address notification, if, in the another determining act, the available network space is identified, wherein the updated proxy tables indicate that the available network address space is assigned to the incoming fresh node;

if, in the another determining act, an available network address space is not identified, again escalating the network-join request to still another parent node in the hierarchical personal area network;

determine through the entire network whether one or more network address spaces are available for allocation to the incoming fresh node;

in response to the determining that one or more network address spaces in the network are available, setting an attribute in the potential parent nodes to enable the incoming fresh node to join the hierarchical personal area network, the attribute independent of the available address space of the potential parent node receiving the network-join request, wherein all potential parent nodes have the same attribute setting;

in response to the determining that no network address spaces in the current network are available, setting the attributes in the network's parent nodes to prevent admitting any network-join request from the incoming fresh node.

2. The tangible computer-readable medium as recited in claim 1, wherein the available network address space comprises one address.

3. The tangible computer-readable medium as recited in claim 1, wherein the available network address space comprises a number of addresses as indicated by the network-join request.

4. The tangible computer-readable medium as recited in claim 1, wherein the method further comprising repeating the another determining act and again escalating act, wherein each repetition operates at another parent node in the hierarchical personal area network.

5. The tangible computer-readable medium as recited in claim 1, wherein the method further comprising repeating, until performing the again fulfilling act, the another determining act and again escalating act, wherein each repetition operates at another parent node in the hierarchical personal area network.

6. The tangible computer-readable medium as recited in claim 1, wherein the method further comprising repeating, until performing the again fulfilling act or reaching a root node of the hierarchical personal area network, the another determining act and again escalating act, wherein each repetition operates at another parent node in the hierarchical personal area network.

7. The tangible computer-readable medium as recited in claim 1, wherein the address notification comprises a data structure, embodied on a computer-readable media, and the address notification data structure has fields comprising: a first field indicating a command frame identifier; a second field indicating a command options; a third field indicating a starting address of the network address space assigned to the incoming fresh node; a fourth field indicating an ending address of the network address space assigned to the incoming fresh node.

8. The tangible computer-readable medium as recited in claim 1, wherein the proxy table comprises a data structure, embodied on a computer-readable media, and the proxy table data structure has fields comprising:
a first field indicating a starting address of the network address space assigned to the incoming fresh node; a second field indicating an ending address of the network address space assigned to the incoming fresh node;
a third field indicating an immediate next hop for a proxy address range, from the starting address in the first field to the ending address in the second field, in the hierarchical personal area network.

9. The tangible computer-readable medium as recited in claim 1, wherein the network nodes of the mesh, peer-to-peer, cluster-tree, hierarchical personal area network communicate with other network nodes via a wired communications link.

10. The tangible computer-readable medium as recited in claim 1, wherein the network nodes of the mesh, peer-to-peer, cluster-tree, hierarchical personal area network communicate with other network nodes via a wireless communications link.

11. The tangible computer-readable medium as recited in claim 1, wherein the network nodes of the mesh, peer-to-peer, cluster-tree, hierarchical personal area network are wireless sensors in a critical wireless personal area network.

12. A tangible computer-readable medium having computer-executable instructions that, when executed on a computing device, perform a method comprising:
receiving a network-join request to join a hierarchical network of network nodes, wherein network addresses are statically allocated to the network nodes;
determining whether a potential parent node has a free network address space available that may be assigned to an incoming fresh node to fulfill the network join-request, wherein the network address space comprises one or more network addresses, and
set an attribute setting at parent nodes in a hierarchical network of network nodes to indicate whether the network-join request will permit the incoming fresh node to join the hierarchical network of network nodes, wherein in response to the determining that no network address spaces in the current network are available, setting the attributes in the network's parent nodes to a setting that prevents admitting any network-join request from the incoming fresh node;
the determining further includes examining the attribute setting at the potential parent node, that attribute being independent of the available network address space of the potential parent node;
based upon the determining act, fulfilling the network-join request with the available network address space if the available network address space is identified in the determining act;
sending—after the fulfilling act—via the hierarchical network of network nodes, an address notification to the incoming fresh node;
updating proxy tables of only those network nodes along a path through the hierarchical network of network nodes taken by the sent address notification, wherein the updated proxy tables indicate that the available network address space is assigned to the incoming fresh node;
based upon the determining act, escalating the network-join request to another parent node in the hierarchical tree if the free network address space is not identified in the determining act.

13. The tangible computer readable medium as recited in claim 12, wherein the hierarchical network is a mesh, peer-to-peer, cluster-tree, hierarchical personal area network of network nodes.

14. The tangible computer readable medium as recited in claim 12, wherein the available network address space comprises one address.

15. The tangible computer readable medium as recited in claim 12, wherein the available network address space comprises a number of addresses indicated by the network-join request.

16. The tangible computer readable medium as recited in claim 12, wherein, after the escalating act, the method further comprising:
- another determining whether another parent node has available network address space that may be assigned to the incoming fresh node to fulfill the join-request;
- if, in the another determining act, the free network address space is identified, fulfilling the network-join request with the available network address space and updating a proxy table of the another parent node so that the updated proxy table indicates that the available network address space is no longer free and is now assigned to the incoming fresh node;
- if, in the another determining act, the available network address space is not identified, escalating the network-join request to still another parent node in the hierarchical network of network nodes.

17. The tangible computer readable medium as recited in claim 16, wherein the method further comprising until performing the again fulfilling act, repeating the another determining act and again escalating act, wherein each repetition operates at another parent node in the hierarchical network of network nodes.

18. The tangible computer readable medium as recited in claim 16, wherein the method further comprising, until performing the again fulfilling act or reaching a root node of the in the hierarchical network of network nodes, repeating the another determining act and again escalating act, wherein each repetition operates at another parent node in the hierarchical network of network nodes.

19. A method comprising:
- receiving—from an incoming fresh node—a network-join request to join a hierarchical network of network nodes, wherein network addresses are statically allocated to the network nodes;
- dynamically reallocating available address space to the incoming fresh node from within a range of network addresses statically allocated to a particular network-node in the hierarchical network of network nodes;
- determine through the entire network whether one or more network address spaces are available for allocation to the incoming fresh node;
- in response to the determining that one or more network address spaces in the network are available, setting an attribute in the potential parent nodes to enable the incoming fresh node to join the hierarchical personal area network, the attribute independent of the available address space of the potential parent node receiving the network-join request, wherein all potential parent nodes have the same attribute setting;
- in response to the determining that no network address spaces in the current network are available, setting the attributes in the network's parent nodes to prevent admitting any network-join request from the incoming fresh node;
- updating proxy tables of network nodes in the hierarchical network of network nodes so that data or commands directed to the dynamically reallocated address space—which is now assigned to the incoming fresh node—are routed to the incoming fresh node rather than to the particular network-node that supplied the available address space for dynamic reallocation, wherein the proxy tables of the network nodes have less than 20 entries.

20. The method as recited in claim 19, wherein the hierarchical network is a mesh, peer-to-peer, cluster-tree, hierarchical personal area network of network nodes.

21. The method as recited in claim 19, wherein the available network address space comprises one address.

22. The method as recited in claim 19, wherein the available network address space comprises a number of addresses indicated by the network-join request.

23. A method comprising:
- routing data or commands through a hierarchical network of network nodes, wherein network addresses are statically allocated to the network nodes when the network is established and the network nodes having proxy tables indicating that one or more address spaces have been reallocated to other nodes since establishment of the network;
- determine through the said entire network whether one or more network address spaces are available for allocation to the incoming fresh node;
- in response to the determining that one or more network address spaces in the network are available, setting an attribute in the potential parent nodes to enable the incoming fresh node to join the hierarchical personal area network, the attribute independent of the available address space of the potential parent node receiving the network-join request, wherein all potential parent nodes have the same attribute setting;
- in response to the determining that no network address spaces in the current network are available, setting the attributes in the network's parent nodes to prevent admitting any network-join request from the incoming fresh node;
- sending via the hierarchical network of network nodes, an address notification to the other nodes receiving reallocated address spaces;
- updating proxy tables of only those network nodes along a path through the hierarchical network of network nodes taken by the sent address notification, wherein the updated proxy tables indicate that the available network address space is assigned;
- checking the proxy tables of network nodes in the hierarchical network so that data or commands directed to the reallocated address spaces are routed to the appropriate other nodes rather than to the nodes to which the reallocated address spaces were originally statically allocated.

24. The method as recited in claim 23, wherein the hierarchical network is a mesh, peer-to-peer, cluster-tree, hierarchical personal area network of network nodes.

25. The tangible computer readable medium as recited in claim 1, wherein the proxy tables of the network nodes have less than 20 entries.

26. The tangible computer readable medium as recited in claim 12, wherein the proxy tables of the network nodes have less than 20 entries.

* * * * *